United States Patent
Mills et al.

(10) Patent No.: US 6,370,304 B1
(45) Date of Patent: Apr. 9, 2002

(54) RADIATION MARKING OF FIBER OPTIC CABLE COMPONENTS

(75) Inventors: Gregory A. Mills, Claremont; Gregory A. Lochkovic, Conover, both of NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/162,309

(22) Filed: Sep. 28, 1998

(51) Int. Cl.[7] ................................................. G02B 6/44
(52) U.S. Cl. ...................................................... 385/114
(58) Field of Search ........................ 385/100–114, 147; 430/945

(56) References Cited

U.S. PATENT DOCUMENTS

| | | | |
|---|---|---|---|
| 4,207,111 A | 6/1980 | Fujiwhara et al. | 430/376 |
| 4,370,542 A | 1/1983 | Mills et al. | 219/121 |
| 4,629,285 A | 12/1986 | Carter et al. | 350/96.23 |
| 4,742,042 A | 5/1988 | Hiraishi et al. | 503/201 |
| 4,808,966 A | 2/1989 | Ferlier et al. | 338/214 |
| 4,894,110 A | 1/1990 | Lass et al. | 156/272.8 |
| 4,900,126 A * | 2/1990 | Jackson et al. | 385/100 |
| 4,959,406 A | 9/1990 | Foltin et al. | 524/413 |
| 4,961,080 A | 10/1990 | Henderson et al. | 346/108 |
| 5,049,721 A | 9/1991 | Parnas et al. | 219/121.68 |
| 5,053,440 A | 10/1991 | Schueler et al. | 523/137 |
| 5,091,284 A | 2/1992 | Bradfield | 430/292 |
| 5,111,523 A * | 5/1992 | Ferlier et al. | 385/100 |
| 5,130,721 A | 7/1992 | Sukhman | 346/1.1 |
| 5,206,280 A | 4/1993 | Williams | 524/409 |
| 5,247,732 A | 9/1993 | Lait et al. | 29/564.4 |
| 5,248,878 A | 9/1993 | Ihara | 219/121.69 |
| 5,259,060 A | 11/1993 | Edward et al. | 385/128 |
| 5,262,470 A | 11/1993 | Shimotsumae et al. | 524/496 |
| 5,300,350 A | 4/1994 | Gosser et al. | 428/195 |
| 5,377,292 A | 12/1994 | Bartling et al. | 385/128 |
| 5,379,363 A | 1/1995 | Bonicel et al. | 385/114 |
| 5,409,504 A | 4/1995 | Fritzsche | 8/444 |
| 5,415,939 A | 5/1995 | Yeung | 428/422 |
| 5,420,575 A | 5/1995 | Cheraso et al. | 340/825.44 |
| 5,422,383 A | 6/1995 | Takahashi et al. | 523/136 |
| 5,474,627 A | 12/1995 | Carriere et al. | 156/47 |
| 5,485,539 A | 1/1996 | Mills | 385/114 |
| 5,489,639 A | 2/1996 | Faber et al. | 524/417 |
| 5,501,827 A | 3/1996 | Deeney et al. | 264/460 |
| 5,554,196 A | 9/1996 | Wielstra | 8/444 |
| 5,567,207 A | 10/1996 | Lockman et al. | 8/444 |
| 5,703,983 A * | 12/1997 | Beasley, Jr. | 385/104 |
| 5,721,329 A | 2/1998 | Fujiwa et al. | 526/316 |
| 5,853,955 A | 12/1998 | Towfiq | 430/270.12 |
| 5,904,037 A * | 5/1999 | Brulick et al. | 385/103 |

FOREIGN PATENT DOCUMENTS

| | | | | |
|---|---|---|---|---|
| EP | 0462499 A2 | 6/1991 | | G02B/6/44 |
| JP | 07092360 A | 4/1995 | | G02B/6/44 |

OTHER PUBLICATIONS

Photopolymer for Recording Holograms; Hideo Tanigawa and Taichi Ichihashi; pp. 641–644.

* cited by examiner

Primary Examiner—Akm E. Ullah
(74) Attorney, Agent, or Firm—Timothy J. Aberle

(57) ABSTRACT

A fiber optic cable component, for example, an optical ribbon (20,22,24,26), individual optical fiber, fiber bundle, or a non-optical fiber component, having a radiation markable section, the radiation markable section including a radiation reactive ingredient compounded with a base matrix material, and methods for creating markings in the radiation markable section. When irradiated with a suitable radiation source, a photochemical reaction occurs that creates markings in the radiation markable section, so that the ribbon classification task may be done with ease and reliability, so that substantial physical damage to the layer by the radiation source is avoided. The marking of fiber optic cable components according to the present invention may, for example, be accomplished by a radiation source of the laser type.

19 Claims, 3 Drawing Sheets

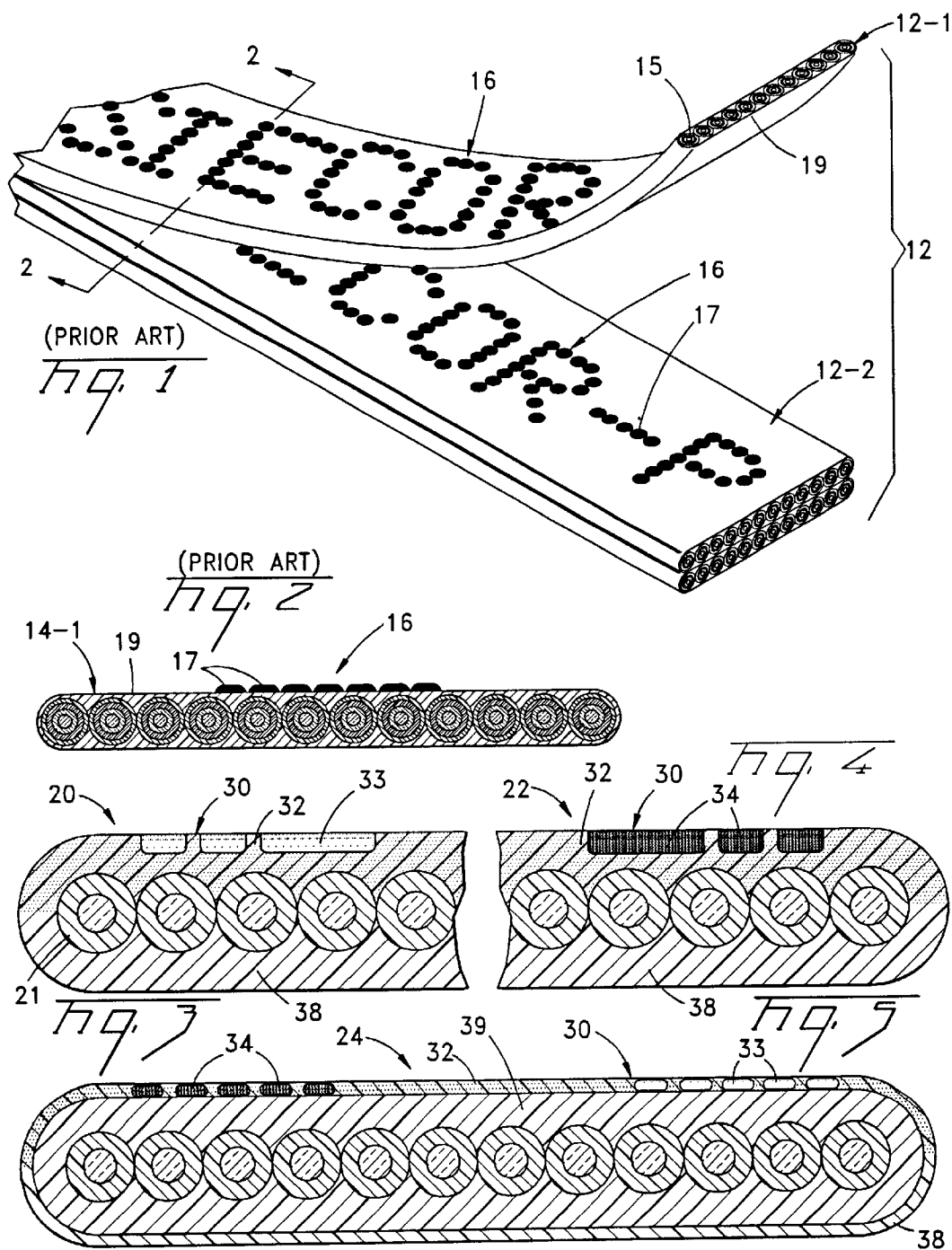

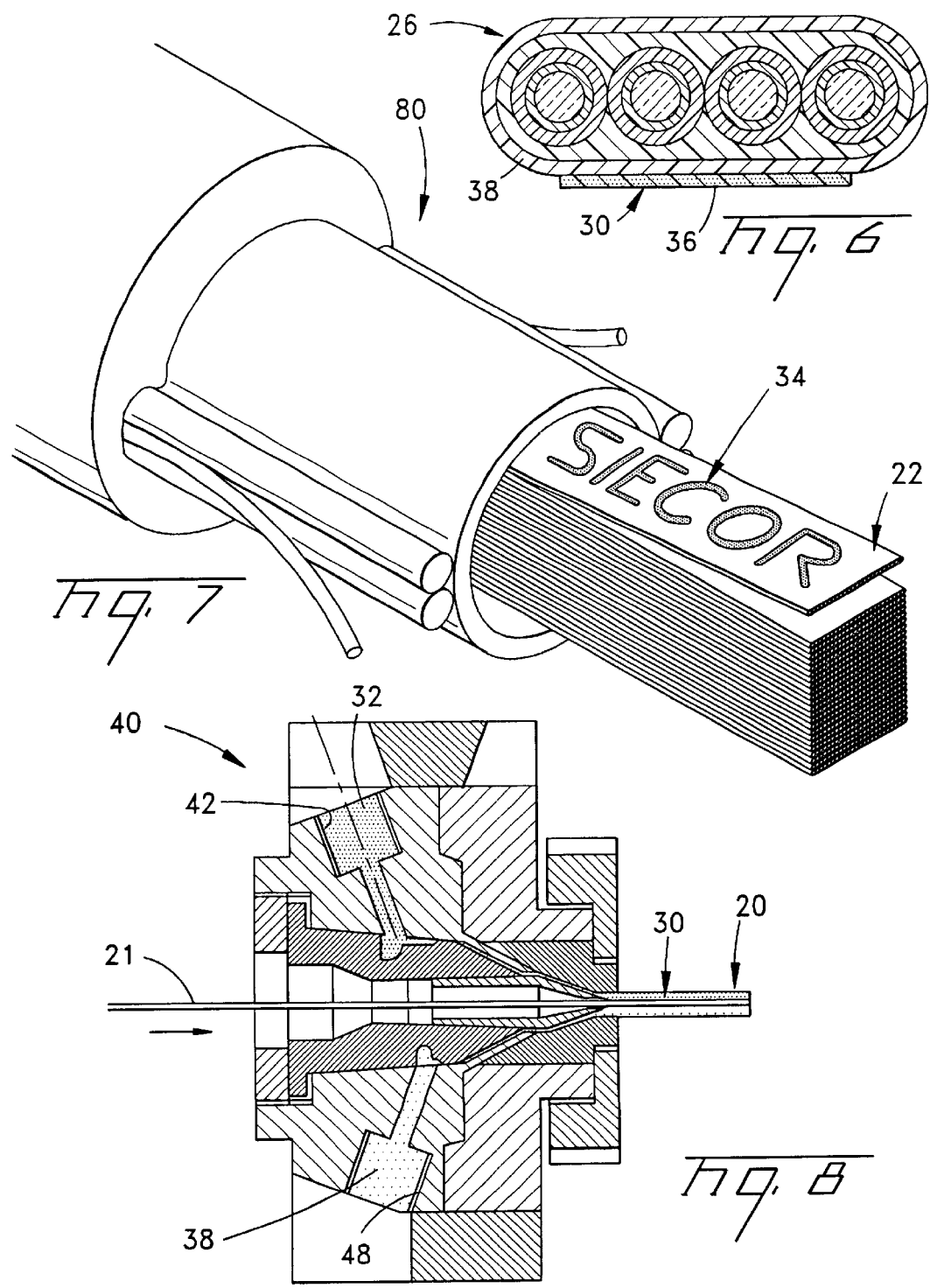

RADIATION MARKING OF FIBER OPTIC CABLE COMPONENTS

The present invention relates to fiber optic cable components and, more particularly, to a fiber optic cable components with markings thereon and methods of making the markings.

Conventional fiber optic cables include optical fiber containing components, for example, optical ribbons or fiber bundles. Optical fibers conduct light which is used to transmit voice, video, and data information. Additionally, fiber optic cables include non-optical fiber containing components, for example, rods, strength members, tapes, etc. The optical fibers in an optical ribbon or fiber bundle are generally encased in a matrix coating of an ultraviolet (UV) light curable type. Typically, such a matrix coating is extruded about a group of optical fibers that have been arranged in an array, and is then cured by irradiation with a UV light source. The cured matrix coating protects the optical fibers and generally fixes the alignment of the respective optical fibers in the array.

Optical fibers may be arranged in an array of the optical ribbon type. FIG. 1 shows adjacent optical ribbons 12-1 and 12-2 of a conventional ribbon stack 12. Optical ribbons 12-1,12-2 each include optical fibers 15 encased in a matrix coating 19. A craftsman may gain access to optical ribbons 12-1,12-2 by cutting away portions of a cable to expose ribbon stack 12. Once stack 12 is exposed, the craftsman may desire to distinguish between and classify the ribbons according to, for example, which telecommunications circuit they are to be associated with. To classify the ribbons, the craftsman may look for markings which uniquely identify the ribbon, for example, a series of alpha-numeric characters which define a label or indicia 16. Indicia 16 includes a series of printed dots 17 which depict the alpha-numeric characters. Dots 17 are small masses of thermal, solvent, or UV curable ink material which present unevenness, e.g., bump-like and/or trough-like (not shown) irregularities on and/or in the surface of matrix coating 19 (FIG. 2). Where ribbons 12-1,12-2 include essentially permanent indicia 16, the craftsman's ribbon classification task may be done with ease and reliability. It is therefore desirable that indicia 16 be essentially permanent, i.e., robust enough to withstand direct abrasion, or protected by an anti-abrasion overcoating.

Known markings of the printed ink type are printed on the matrix coating of an optical fiber array, or directly on the optical fibers, but such markings may have disadvantages. U.S. Pat. No. 5,485,539, incorporated by reference herein, discloses printed ink dots on a matrix coating that define layered dots that form symbols, and a transparent, anti-abrasion coating may be applied over the printed ink dots. U.S. Pat. No. 5,119,464 discloses a process for directly marking optical fibers with ink as they move in an array, before being coated with a protective envelope, so that staggered bands of ink are formed on the optical fibers. Disadvantageously, however, the printed ink type markings may be removed by a solvent when the ink is on the surface, the print of a ribbon or bundle may be transferred to an adjacent ribbon, and/or the printed ink dots may cause an undesirable level of attenuation loss in the optical fibers.

Laser marking techniques have been developed to mark fiber optic cable components (e.g., cable jackets), but cause substantial ablation of portions of the cable jacket. Substantial laser ablation of fiber optic cable components can result in undesirable physical damage of such components, for example, optical ribbons or bundles. A known laser marking technique is used to mark optical cable jackets formed of a robust, black polyethylene material suited to the outdoor environment, as disclosed in U.S. Pat. No. 5,049,721, incorporated by reference herein. Substantial laser ablation causes physical damage in the form of craters in the black polyethylene jacket. A colored wax of a contrasting color is packed into the craters. The contrasting color wax defines a dot matrix of an alpha-numeric configuration; however, this configuration may not be essentially permanent, as the colored wax may be rubbed off or otherwise become dislodged or flow out of the craters. The physical damage associated with substantial laser ablation of this kind is not particularly suited for use with optical ribbons or bundles, as the laser would likely punch holes through the optical ribbon and destroy the optical fibers. Moreover, ablated craters can negatively affect the robustness of a thin matrix coating.

Multi-layer cable jackets having laser markable surfaces are expensive, and can be too large for application to optical ribbons, individual optical fibers, or fiber bundles. A laser marking method for use with a fiber optic cable having an outer jacket with inner and outer varnish layers is disclosed in U.S. Pat. No. 5,111,523, and is incorporated by reference herein. The inner and outer varnish layers require specialized formulations that are applied around the entire circumference of the fiber optic cable jacket. The thickness of the outer layer is greater than 5 $\mu$m and less than 25 $\mu$m, and it is intended to be transformed superficially only at the point of laser impact so as to leave a mark which is darker than the inner varnish layer by virtue of its pigment being transformed. The outer layer may be ablated thereby revealing the inner layer, of a minimum thickness between 15–25 $\mu$m, which reflects the laser radiation. The transformation or ablation can result in substantial physical damage to the outer varnish layer. Additionally, the two-layer method of marking a fiber optic cable jacket is expensive, and, given size constraints, may not be suitable for application on an optical fiber ribbon, individual optical fibers, or fiber bundles.

OBJECTS OF THE INVENTION

It is an object of the present invention to provide a fiber optic cable component comprising a radiation markable section including a radiation reactive ingredient, exposure to a radiation source causing a marking to be made in the radiation markable section so that physical damage to the layer by the radiation is avoided. The radiation reactive ingredient can, for example, be selected from the group of photoreactive ingredients consisting of an inorganic compound, a metal salt, a radiation reactive dye, a silver halide material, and a photoreactive acrylate material.

It is another object of the present invention to provide a method of marking a fiber optic cable component, comprising the steps of irradiating a radiation markable section on a fiber optic cable component with a radiation source and causing a photochemical reaction in the radiation markable section whereby a marking is made in the radiation markable section that contrasts with a color of another material so that physical damage to the radiation markable section by the radiation is avoided. The method may utilize a laser as a source of radiation.

BRIEF DESCRIPTION OF THE DRAWING FIGURES

FIG. 1 is an isometric view of an optical ribbon having conventional ink dots according to the prior art.

FIG. 2 is a cross sectional view of the optical ribbon of FIG. 1 taken at line 2—2.

FIG. 3 is a cross sectional view of a portion of an optical ribbon with markings in accordance with the present invention.

FIG. 4 is a cross sectional view of a portion of an optical ribbon with markings in accordance with the present invention.

FIG. 5 is a cross sectional view of an optical ribbon with markings in accordance with the present invention.

FIG. 6 is a cross sectional view of an optical ribbon with markings in accordance with the present invention.

FIG. 7 is an isometric view of a fiber optic cable incorporating an optical ribbon with markings in accordance with the present invention.

FIG. 8 is a cross sectional view of a ribbonizing die in accordance with the present invention.

DETAILED DESCRIPTION OF THE INVENTION

Figure 9:
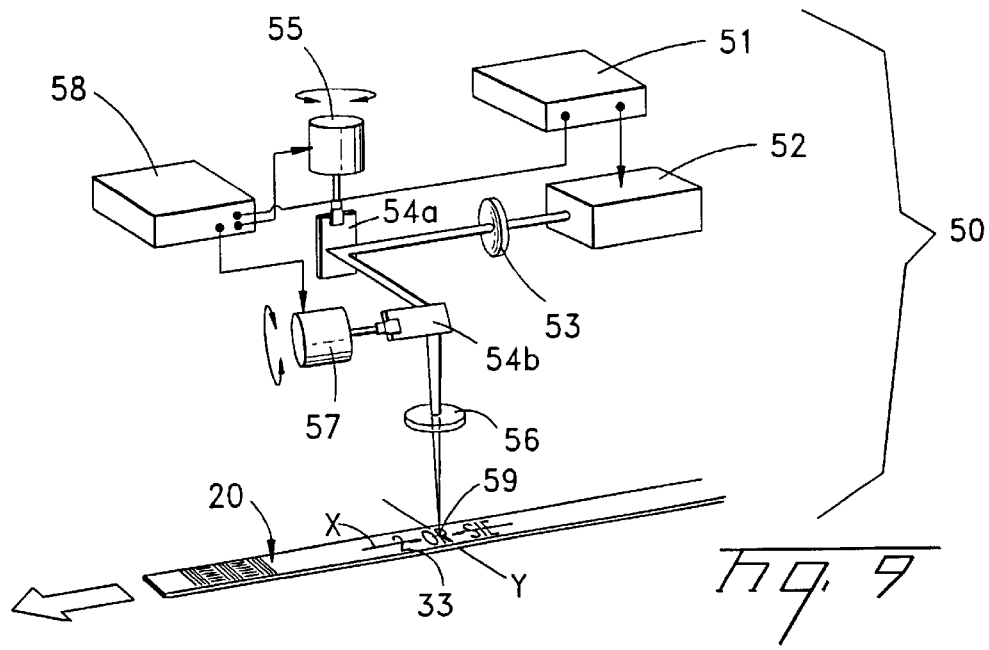
FIG. 9 is a schematic view of a marking apparatus in accordance with the present invention.

The present invention is directed to a fiber optic cable component, for example, an optical ribbon, individual optical fiber, fiber bundle, or a non-optical fiber component, having a radiation markable section, the radiation markable section including a radiation reactive ingredient compounded with a base matrix material. When irradiated with a suitable radiation source, a photochemical reaction occurs that creates markings in the radiation markable section, the markings being in color-contrast to adjacent areas, so that the ribbon classification task may be done with ease and reliability. The photochemically made markings avoid the unevenness of the ink dot type markings of the prior art, and avoid physical damage to the radiation markable section, so that marking induced attenuation is minimized and a suitable modulus is preserved. The marking of fiber optic cable components according to the present invention may, for example, be accomplished by a radiation source of the laser type.

With reference to FIGS. 3–6, exemplary fiber optic cable components in the form of optical ribbons 20,22,24,26 of the present invention will be described. Each of optical ribbons 20,22,24,26 includes a layer 30 surrounding optical fibers 21, the fibers preferably include distinct color coatings. Layer 30 is a composite matrix that includes a material section in the form of a radiation markable section 32, and may include a material section in the form of a transparent or a translucent section 38. Radiation markable section 32 includes a radiation reactive ingredient that can be compounded with a base matrix material in a way that defines a photochemically reactive substance. The radiation reactive ingredient may be, for example, an inorganic compound, a metal salt, a radiation reactive dye, a silver halide material, and/or a photoreactive acrylate material.

Layer 30 may be applied to a fiber optic cable component in different ways and may exhibit various colors, shades, tones, etc. after irradiation. For example, radiation markable section 32 of optical ribbon 20 can be marked with a radiation source to define dots/lines 33 (FIG. 3) of a light or faded tone or color. Dots/lines 34 of a relatively darker tone or color may also be made in layer 30, as embodied in optical ribbon 22 (FIG. 4). Layer 30 may be applied over a conventional matrix layer 39 in an optical ribbon 24 (FIG. 5). In addition, layer 30 can define a thin layer 36, e.g., a film thickness layer, applied on optical ribbon 26 (FIG. 6) that can be marked with dots/lines (not shown). The markings made in layer 30 can be in the form of, for example, alpha-numeric characters, stripes, bands, bar codes, holograms, logos, and/or trademarks.

It may be desirable to incorporate any number of optical ribbons of the present invention in a fiber optic cable. Any of optical ribbons 20,22,24,26 or combinations thereof may be formed into a stack and incorporated into a fiber optic cable, for example, a fiber optic cable 80 (FIG. 7) of the mono-tube type. Fiber optic cable 80 includes, for example, a stack of optical ribbons 22 with relatively dark markings 34 thereon.

As noted above, radiation markable section 32 is a compound of a radiation reactive ingredient and a base matrix material. In addition to binding optical fibers 21 together, the base matrix material functions as a color contrasting carrier for the radiation reactive ingredient. The base matrix material preferably is, as noted above, transparent or translucent; however, where it is not desired to observe the color coatings of the optical fibers, the base matrix material may include an opaque coloring agent. The base matrix material should provide a contrasting background relative to the marking formed after irradiation of layer 30. Additionally, layer 30 preferably has a suitable modulus characteristic of 50–1500 mPa, i.e., a modulus that is not overly modified by compounding the base matrix material with the radiation reactive ingredient. Moreover, the modulus of the base matrix material should not be overly modified by controlled radiation dosages associated with radiation marking methods of the present invention, described hereinbelow. Exemplary base matrix materials include radiation curable resins, for example, UV curable resins of the acrylate type, as disclosed in U.S. Pat. No. 4,900,126, which is incorporated by reference herein.

As noted above, the radiation reactive ingredient may be any suitable photoreactive substance that is compatible with the base matrix material and results in acceptable physical properties, e.g., modulus. Exemplary radiation reactive ingredients include an inorganic compound and a pigment, a metal salt, a radiation reactive dye, a silver halide material, or a photoreactive acrylate material. The mixture may be, for example, mica and a pigment, e.g., titanium dioxide, that is susceptible to a photochemical reaction in the form of a pigmentation process, or photo-degradation in the form of ablation, charring, or discoloring. Degradation should not result in substantial physical damage to the desired properties of the optical ribbon. In addition, the radiation reactive ingredient may be a mixture of carbon black and titanium dioxide, as disclosed in U.S. Pat. No. 4,959,406, incorporated by reference herein. Other titanium dioxide compounds for laser marking may be used as well, for example as disclosed in U.S. Pat. No. 5,501,827, incorporated by reference herein.

The radiation reactive ingredient may include a laser beam absorbing inorganic ingredient and a colorant physically bonded to the laser absorbing inorganic ingredient that is capable of changing color upon being irradiated with a laser beam, as disclosed in U.S. Pat. No. 5,422,383, incorporated by reference herein. Such suitable inorganic ingredients include cordierite, zeolite, zirconium silicate, and calcium silicate. Suitable colorants include ferri hydroxide, cuprous hydroxide, and other metal containing compounds that are white, black, or blue at room temperature but change to either a different color or become faded or colorless upon irradiation with a laser beam.

The radiation reactive ingredient may include a metal salt that is susceptible to photochemical action. For example, the metal salt reaction may be performed by a cuprous salt, or molybdenum oxide, as disclosed in U.S. Pat. No. 5,053,440 or U.S. Pat. No. 5,489,639, both of which are incorporated by reference herein. Additionally, the radiation reactive ingredient may include a metal salt having a larger mean particle size than a typical pigment, as disclosed in U.S. Pat. No. 5,501,827, incorporated by reference herein. The radiation reactive ingredient can include a metal salt and a fatty acid as disclosed in U.S. Pat. No. 5,300,350, incorporated by reference herein. Suitable fatty acids include stearic acid, palmitic acid, and myrstic acid; and suitable metal salts are of the zinc, calcium, magnesium, and sodium types.

The radiation reactive ingredient of the present invention can include an azo-dye that is susceptible to photochemical action in the form of a dye coloring process. An azo-dye is any of a class of synthetic organic dyes that contain nitrogen as the azo group "-N=N-" as part of their molecular structures, as disclosed in U.S. Pat. No. 5,554,196. The base matrix material compounded with an azo-dye forming section 32 can be marked by means of an UV-laser or IR-laser where the azo-dye comprises a dye precursor and a coupler. The dye precursor can be a heterocyclic mono- or bis-arylsulphonylhydrazone, and the coupler may be, for example, an indole, aniline, pyrazoline or malonitrile, so that after irradiation with UV-laser light or IR-laser light an azo-dye is formed.

Additionally, the dye coloring process can be performed by a radiation reactive ingredient including an azo-dye having a silver halide photoreactive material that is photoreactive in the visible (V) light range. Suitable silver halide photoreactive materials are disclosed in U.S. Pat. No. 4,207,111, incorporated by reference herein. Formation of color markings can be accomplished by subjecting radiation markable section 32 having the visible light-reactive silver halide material therein to color development by the use of an aromatic primary amine type developing agent in the presence of a cyan coupler, a magenta coupler, and a yellow coupler. The silver halide particles present in the exposed color photoreactive material are reduced by the developing agent. An oxidation product of the developing agent reacts by coupling with the couplers to form a cyan dye, a magenta dye, and a yellow dye respectively, thereby forming a color marking.

Moreover, the dye coloring process can be performed by a radiation reactive ingredient including a photo-bleachable dye that is responsive to laser light, as disclosed in U.S. Pat. No. 5,567,207, incorporated by reference herein. Preferably, the laser radiation is controlled so that photo-bleaching of the dye occurs without substantially damaging the base matrix material.

Furthermore, the dye coloring process may be performed by a radiation reactive ingredient including a thermoreactive dye containing as major constituents an ordinarily colorless or slightly colored dye precursor and an electron receptive developer. Upon being heated by means of a thermal head, thermal pen, or laser beam, the major constituents instantly react with each other to form a recorded image in layer 30. Suitable dye precursors and developers are disclosed in U.S. Pat. No. 4,742,042, incorporated by reference herein. Use of the dye precursor and developer can result in color images being formed in radiation markable section 32.

The dye coloring process may be performed by a radiation reactive ingredient including a fixing dye as disclosed in U.S. Pat. No. 5,409,504, which is incorporated herein by reference. The radiation reactive ingredient that is markable by irradiation with UV light may be a fixing dye containing at least one polymerizable double bond, or at least one polymerizable ring system, and at least one photosensitizer.

Additionally, images can be produced in radiation markable section 32 which change their appearance when the viewing angle is changed, as disclosed in U.S. Pat. No. 4,894,110, which is incorporated by reference herein, in the form of, for example, a three-dimensional image (hologram). Moreover, radiation markable section 32 may include photoreactive acrylates, for example, as disclosed in U.S. Pat. Nos. 5,395,730 and 4,987,048, incorporated by reference herein film 36.

Manufacture of an optical ribbon, with exemplary reference to a fiber optic cable component in the form of optical ribbon 20, can be accomplished by using a ribbonizing die 40 (FIG. 8) adapted for co-extrusion of the radiation markable compound with the matrix material. Ribbonizing die 40 includes an inlet port 42 for receiving the radiation markable compound of markable section 32 under suitable temperature and pressure conditions, and includes an inlet port 48 for receiving matrix material 38 under suitable temperature and pressure conditions. The radiation markable compound and matrix material 38 are extruded about an array of optical fibers 21. Next, optical ribbon 20 is fed into to a curing area (not shown) where layer 30 is polymerized. Apparatuses for ribbonizing in general, that are hereby incorporated by reference herein, include: U.S. Pat. Nos. 4,720,165; 4,950,047; 5,252,050; and 5,333,233.

A first method of marking a fiber optic cable component, i.e., exemplary optical ribbon component 20 prior to or after polymerization of layer 30, will now be described with reference to a marking apparatus 50 (FIG. 9). Marking apparatus 50 includes a laser controller 51 operatively associated with a programmable central processing unit (CPU) 58 and a radiation source, for example, a laser oscillator 52. CPU 58 is programmed to control the operating parameters of laser oscillator 52, for example, laser beam scan rate, power density, average power, pulse rate and width, and/or repetition rate. Marking apparatus 50 further includes scanning mirrors 54a,54b connected to respective motors 55,57, which, in turn, are controlled by CPU 58. Marking apparatus 50 may include first and second focusing lenses 53,56 for narrowing the laser beam to a focal point 59. Apparatuses for laser marking in general, incorporated by reference herein include: U.S. Pat. Nos. 5,567,207; 4,961,080; 4,874,919; and 4,370,542.

CPU 58 is operative to execute its internal program whereby focal point 59 describes the desired characters/pattern to be made on optical ribbon 20 as the ribbon continuously moves along a production line. In defining a continuous process, the laser beam scan rate, power density, average power, pulse rate and width, and repetition rate are synchronized to the line speed of optical ribbon 20. CPU 58 controls the X-Y position of focal point 59 by adjusting scanning mirrors 54a,54b which are controlled by motors 55,57. In this way, focal point 59 can be scanned across ribbon 20 in a continuous or pulsed beam, irradiating layer 30 and causing a photochemical reaction that results in the desired characters/patterns.

Figure 10:
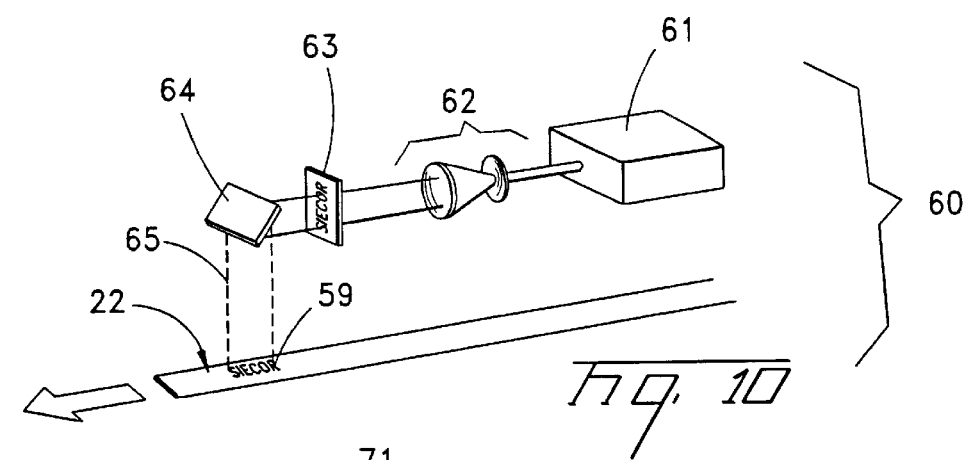
FIG. 10 is a schematic view of a marking apparatus in accordance with the present invention.

According to another method of the present invention, a fiber optic cable component, for example, exemplary optical fiber ribbon 22 may be marked by an image-wise marking apparatus 60 (FIG. 10). Marking apparatus 60 can include a radiation source, for example, a laser oscillator 62 that may be controlled by a CPU and laser controller as in the embodiment of FIG. 9. Marking apparatus 60 can further include a beam expander 62, a mask 63, and a mirror 64. In operation, the laser beam emitted by laser oscillator 62 is expanded by beam expander 61. The light is shaped by stationary mask 63 into a desired image, and then the image is reflected by mirror 64 onto radiation markable section 32 of optical ribbon 22. The shaped light impinging on layer 32 causes a photochemical reaction which marks optical ribbon 22 according to the contours of the image.

Figure 11:
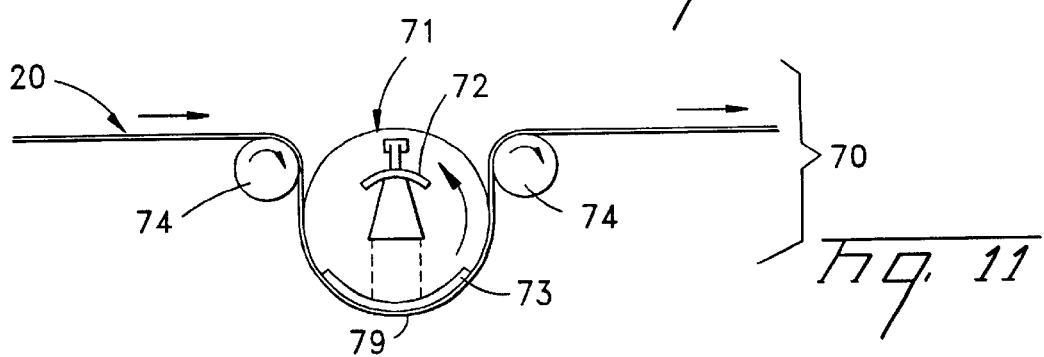
FIG. 11 is a schematic view of a marking apparatus in accordance with the present invention.

Alternatively, a marking apparatus 70 (FIG. 11) including a non-stationary mask 71 may be used to produce an image in a fiber optic cable component, for example, optical ribbon 20. Marking apparatus 70 includes a radiation source 72, a rotating mask 71 including a mask template 73 with the profile of the image to be marked, and guide pulleys 74. Optical ribbon 20 is continuously fed through apparatus 70 and is wrapped at least partially about rotating mask wheel 71. As this occurs, radiation source 72 emits light through the profile and into optical ribbon 20 thereby causing a photochemical reaction resulting in an image 79.

The images made by apparatuses 50,60,70 may depict a pattern/characters in the form of a registered trademark, e.g., SIECOR®. As noted above, the markings made in layer 30 can be in the form of, for example, alpha-numeric characters, stripes, bands, bar codes (FIG. 9), holograms, and/or logos. Depending on which radiation reactive ingredient is used, the image/lines/dots etc. made by marking apparatuses 50,60,70 may be black, white, gray, or another color. Marking apparatuses 50,60,70 may be adapted for use in the marking of fiber optic cable components other than optical ribbons, fiber bundles, or individual optical fibers.

In accordance with the present invention, the need to have a sufficient dosage of radiation on radiation markable section 32 to photochemically create a marking therein may be balanced against the need to avoid physical damage to the optical ribbon (or other fiber optic cable component). In particular, degradation and/or substantial ablation of layer 30 that can result in, for example, delaminations, solvent ingress, stress risers, and/or failure sites should be avoided. To avoid physical damage to layer 30, laser oscillators 52,62 can be of the excimer, frequency-tripled YAG, copper, or frequency-doubled YAG laser oscillator type, as discussed in U.S. Pat. No. 5,111,523 (incorporated by reference hereinabove). In general, the radiation dose which strikes the balance noted above may depend on one or more factors, for example, the controlled operating parameters of the radiation source, the distance of radiation markable section 32 from the radiation source, the type and amount of photosensitizer used, and the permeability of the layer.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, fiber optic cable components in the form of optical fiber arrays of the non-planar type, e.g., optical fiber bundles, can include a radiation markable section 32 according to the present invention. Moreover, radiation markable section 32 can be applied to fiber optic cable components such as, e.g., cores, rods, strength members, tapes, etc. as disclosed in U.S. Ser. Nos. 09/089,201 and 09/048,486, which are respectively incorporated by reference herein. Further, radiation markable section 32 may be extended to fully circumscribe any part of an optical ribbon, bundle, or fiber, or it may be a longitudinally extruded stripe. Moreover, a release agent, e.g., a Teflon® dry lubricant, can be applied adjacent to radiation markable section 32, for creating a controlled weak interface or separation layer. Radiation markable section 32 may be overcoated with a protective layer and/or bonded to a substrate with an adhesive. The radiation reactive ingredients may be used singly, or combined in distinct portions of radiation markable section 32, or where compatible, mixed together. Radiation markable sections 32 may be included in a fiber optic cable component using the same or different ingredients. Radiation sources may be sources which emit bands of electromagnetic radiation other than in the IR, UV or V-light ranges. Electron beams may be used as an alternative to electromagnetic radiation sources.

Accordingly, what is claimed is:

1. A fiber optic cable component, comprising:
a radiation markable section including a radiation reactive ingredient comprising a photoreactive substance selected from the group of photoreactive ingredients consisting of a silver halide material, a photoreactive acrylate material or a radiation reactive dye; exposure to a radiation source causing said photoreactive substance to form a marking in said radiation markable section so that substantial physical damage to the layer by said radiation is avoided.

2. The fiber optic cable component of claim 1, said radiation markable section comprising a matrix material.

3. The fiber optic cable component of claim 1, said fiber optic cable component comprising an optical fiber array.

4. The fiber optic cable component of claim 1, said fiber optic cable component comprising an optical fiber.

5. The fiber optic cable component of claim 1, said radiation markable section comprising a base matrix material.

6. The fiber optic cable component of claim 1, said radiation markable section being disposed on an optical fiber containing component but does not surround the component.

7. The fiber optic cable component of claim 6, wherein part of said component not covered by said radiation markable section includes a clear or translucent matrix material.

8. The fiber optic cable component of claim 1, said physical damage including delaminations, solvent ingress, stress risers, and/or failure sites.

9. The fiber optic cable of claim 1, wherein said radiation reactive ingredient comprises a thermo-reactive substance.

10. A fiber optic cable component, comprising:
at least one optical fiber;
a composite matrix disposed about said optical fiber, said composite matrix comprising at least two distinct material sections;
one of said material sections comprising a radiation markable section including a radiation reactive dye comprising a photoreactive substance, exposure of said radiation markable section to a radiation source causing a photochemical reaction of said photoreactive substance which results in a marking being formed in said radiation markable section so that substantial physical damage to said radiation markable section by said radiation is avoided.

11. The fiber optic cable component of claim 10, said composite matrix surrounding a plurality of optical fibers.

12. The fiber optic cable component of claim 10, said composite matrix comprising part of an optical fiber ribbon.

13. The fiber optic cable component of claim 10, said at least one optical fiber being observable through one of said material sections.

14. The fiber optic cable of claim 10, said radiation reactive dye is selected from the group of dyes consisting of an azo-dye or a photo-bleachable dye.

15. The fiber optic cable of claim 10, said radiation reactive dye further comprising an azo-dye having a silver halide photoreactive substance.

16. A fiber optic cable component, comprising:

at least one optical fiber;

a composite matrix disposed about said optical fiber, said composite matrix comprising at least two distinct material sections;

one of said material sections comprising a radiation markable section including a radiation reactive ingredient comprising a photoreactive acrylate substance, exposure of said radiation markable section to a radiation source causing a photochemical reaction of said photoreactive substance which results in a marking being formed in said radiation markable section so that substantial physical damage to said radiation markable section by said radiation is avoided.

17. The fiber optic cable component of claim 16, said composite matrix surrounding a plurality of optical fibers.

18. The fiber optic cable component of claim 16, said composite matrix comprising part of an optical fiber ribbon.

19. The fiber optic cable component of claim 16, said at least one optical fiber being observable through one of said material sections.

* * * * *